(12) United States Patent
Lupke et al.

(10) Patent No.: US 7,524,177 B2
(45) Date of Patent: Apr. 28, 2009

(54) PIPE MOLDING SYSTEM WITH VACUUM AND TEMPERATURE CONTROLS OF COOLING PLUGS

(76) Inventors: Manfred A. A. Lupke, 92 Elgin Street, Thornhill, Ontario (CA) L3T 1W6; Stefan A. Lupke, 32 Vintage Lane, Thornhill, Ontario (CA) L3T 1X6

(*) Notice: Subject to any disclaimer, the term of this patent is extended or adjusted under 35 U.S.C. 154(b) by 256 days.

(21) Appl. No.: 10/579,444

(22) PCT Filed: Nov. 24, 2004

(86) PCT No.: PCT/CA2004/002016

§ 371 (c)(1),
(2), (4) Date: May 15, 2006

(87) PCT Pub. No.: WO2005/049302

PCT Pub. Date: Jun. 2, 2005

(65) Prior Publication Data

US 2007/0134357 A1    Jun. 14, 2007

(30) Foreign Application Priority Data

Nov. 24, 2003   (CA) .................................... 2450560

(51) Int. Cl.
*B29C 47/90*    (2006.01)
(52) U.S. Cl. .................. 425/143; 425/233; 425/326.1; 425/336; 425/369; 425/378.1; 425/384; 425/388; 425/396

(58) Field of Classification Search ................. 425/143, 425/233, 326.1, 336, 369, 370, 378.1, 384, 425/388, 396
See application file for complete search history.

(56) References Cited

U.S. PATENT DOCUMENTS

| 4,510,013 | A | * | 4/1985 | Lupke et al. | 156/498 |
| 4,770,618 | A | * | 9/1988 | Lupke | 425/72.1 |
| 4,789,327 | A | * | 12/1988 | Chan et al. | 425/133.1 |
| 4,865,797 | A | * | 9/1989 | Jarvenkyla | 264/508 |
| 5,139,730 | A | * | 8/1992 | Holso et al. | 264/508 |
| 6,312,628 | B1 | * | 11/2001 | Wieder et al. | 264/37.27 |

* cited by examiner

*Primary Examiner*—Robert B Davis
*Assistant Examiner*—Joseph Leyson

(57) ABSTRACT

A pipe mold (1) produces plastic pipe with an internal wall having a first wall portion (23, 25) and a second wall portion (27). The pipe mold (1) includes a two stage cooling plug (35) to assist in setting the pipe wall. The first cooling stage (37) is controlled to remove heat from the pipe wall to partially set the plastic without excessive cooling. The partially set plastic pipe then passes over a second stage (39) where less precision in the cooling of the pipe occurs. The partially set plastic is more tolerant and subject to less damage. Preferably both the first and second stages (37, 39) include separate temperature sensors (120, 122) and control arrangements (124, 126) for varying the cooling medium of each stage. In a preferred embodiment a cooling medium is circulated through a first stage at a temperature and at a flow rate to maintain the first stage (37) within a narrow temperature range about the temperature of the cooling medium. The staged cooling plug (35) allows better control at initial startups and with varying operating conditions.

6 Claims, 5 Drawing Sheets

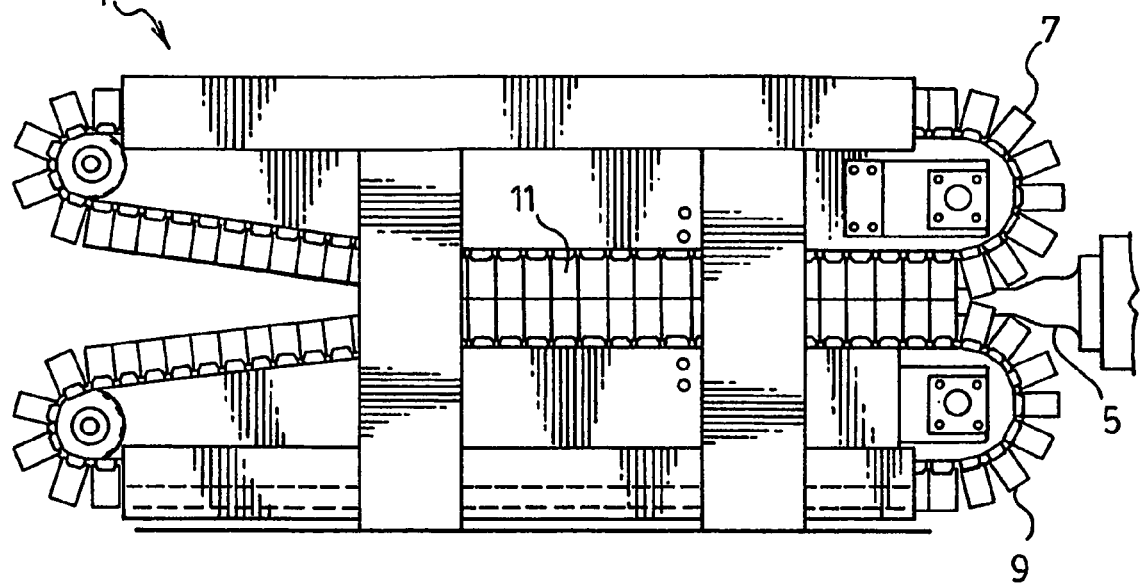
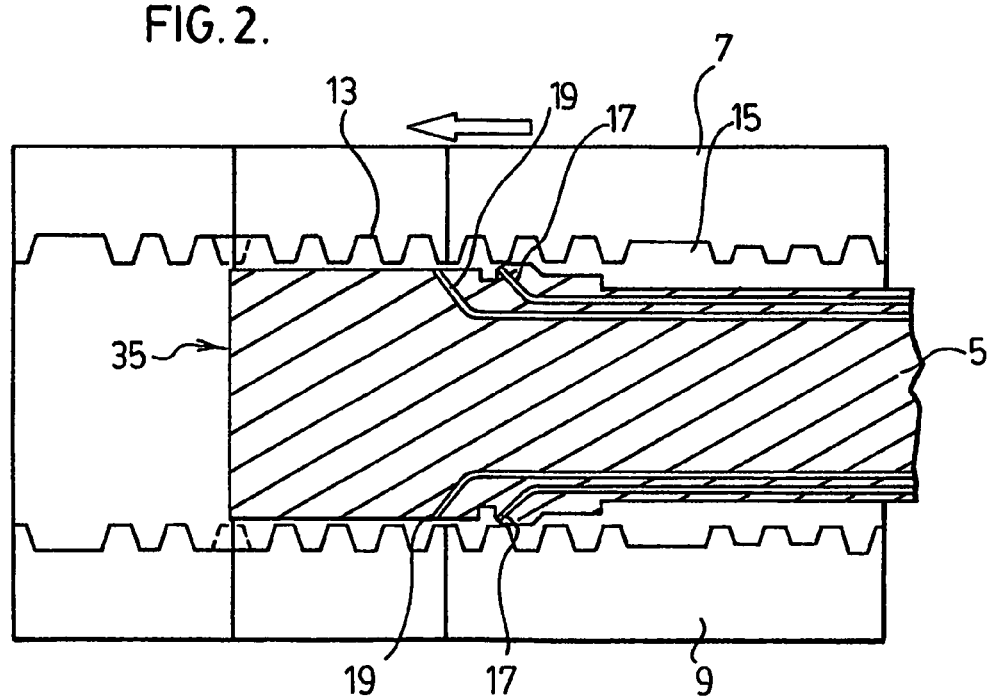

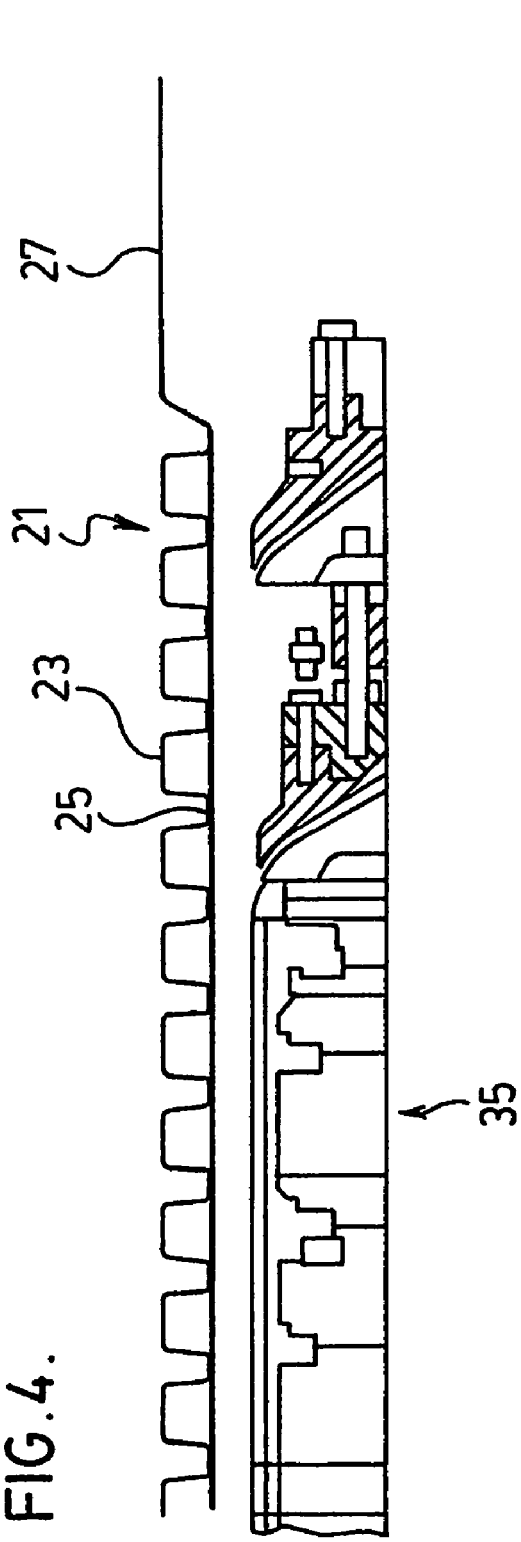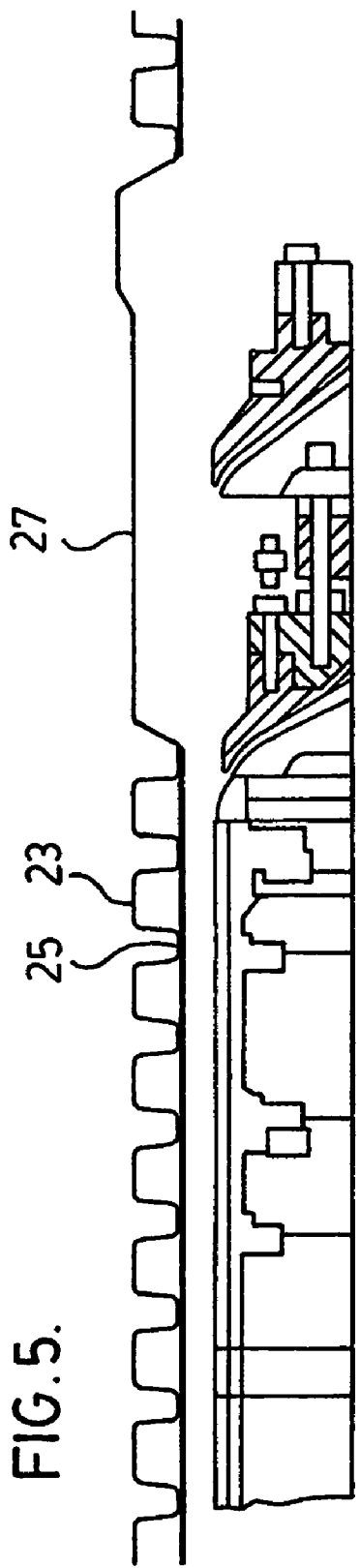
FIG.4.
FIG.5.

PIPE MOLDING SYSTEM WITH VACUUM AND TEMPERATURE CONTROLS OF COOLING PLUGS

FIELD OF THE INVENTION

The present invention relates to a plastic pipe mold of the type using a moving mold tunnel including a cooling plug for setting of the pipe shape within the moving mold tunnel.

BACKGROUND OF THE INVENTION

In the pipe molding art, it is known to use mold blocks which move through a molding path commonly referred to as a moving mold tunnel. The mold blocks are fed with molten plastic from a plastic extruder and the molten plastic is shaped to the contour of the mold block in the moving mold tunnel. Provided in the moving mold tunnel is a plastic setting device known in the industry as a cooling plug.

A conventional cooling plug is cooled typically by means of chilled water which is run through coils at the surface of the cooling plug. The internal wall of the plastic pipe may be pulled by vacuum onto the surface of the cooling plug to help in setting the shape of the pipe wall.

The above described cooling plug operation is very efficient as long as there is continuous contact with the pipe wall. However, some pipes are made with internal walls which have wall portions which are not in contact with the cooling plug. These wall portions may for example be coupling portions built directly into the wall of the pipe. Such coupling portions have a greater internal diameter than the main body of the pipe and as such are spaced outwardly away from the cooling plug.

The formation of the main pipe body and the coupling portions in the pipe wall is a continuous process. Therefore, following the formation of a coupling portion is a further wall portion which returns to a diameter which once again contacts the exterior surface of the cooling plug. However, the cooling plug during the time of forming the coupling wall portion drops to an unacceptably low temperature. This is because the chilling of the cooling plug is normally offset by the contact with the heated molten plastic. When the heated molten plastic is not in contact with the cooling plug as is the case during the formation of the coupling portion there is nothing to control the drop in temperature of the cooling plug. When this happens, the pipe wall portion following the coupling portion and coming into contact with the overly chilled cooling plug is cooled too much by the plug. This results in excessive, too rapid hardening and even cracking of the pipe wall. This continues until the temperature of the cooling plug has been brought back up to an acceptable level by further contact with the heated plastic of the pipe wall.

As a result of the above there is an undesirable loss of part of the pipe wall immediately following the coupling portion built into the pipe wall.

SUMMARY OF THE PRESENT INVENTION

The present invention provides a pipe molding system designed to overcome the problems noted immediately above. More particularly, a pipe molding system according to the present invention which produces plastic pipe includes a plurality of moving first mold block sections and moving second mold block sections. The first mold block sections close with the second mold block sections to form a moving mold tunnel. The system includes means for feeding molten plastic to the first and second mold block sections to form the plastic pipe. Also provided is a cooling plug for setting the plastic in the moving mold tunnel.

The plastic pipe has an internal wall layer with a first wall portion which travels over and is in contact with the cooling plug and a second wall portion e.g., a belled coupling portion, which travels over and is spaced outwardly away from the cooling plug.

The first wall portion of the internal pipe wall layer applies heat directly to and provides a first temperature control to prevent excessive plug cooling as the first wall portion of the initial pipe wall layer travels over the cooling plug. The system further includes a second temperature control which operates to replace the first temperature control in preventing the excessive plug cooling as the second wall portion of the internal wall layer of the pipe travels over the cooling plug.

The second temperature control may be provided by varying the flow or temperature or both of the chilled water which is used to cool the cooling plug. Alternatively, the second temperature control may be provided by a heater which acts on the cooling plug while the second wall portion of the internal pipe wall layer passes over the cooling plug.

As a further preferred feature of the present invention, the cooling plug itself may have a plurality of plug sections with both vacuum and temperature controls being provided at each of the plug sections. These vacuum and temperature controls will operate in accordance with which particular wall portion i.e., the first or the second wall portion is located over the respective cooling plug sections.

BRIEF DESCRIPTION OF THE DRAWINGS

The above as well as other advantages and features of the present invention will be described in greater detail according to the preferred embodiments of the present invention in which;

FIG. 1 is a side view of an overall pipe molding apparatus according to a preferred embodiment of the present invention;

FIG. 2 is a sectional view through the mold tunnel of the pipe molding apparatus of FIG. 1;

FIGS. 4 through 7 show different stages of movement of plastic pipe formed in the apparatus of FIG. 1 over the die tooling shown in FIG. 3;

FIG. 8 is a partial schematic of a temperature feedback system for controlling the flow control valves;

FIG. 9 is a partial schematic of an alternate embodiment;

FIG. 10 is a replacement one or two stage cooling plug; and

FIG. 11 is a controlled single stage cooling plug.

Figure 3:
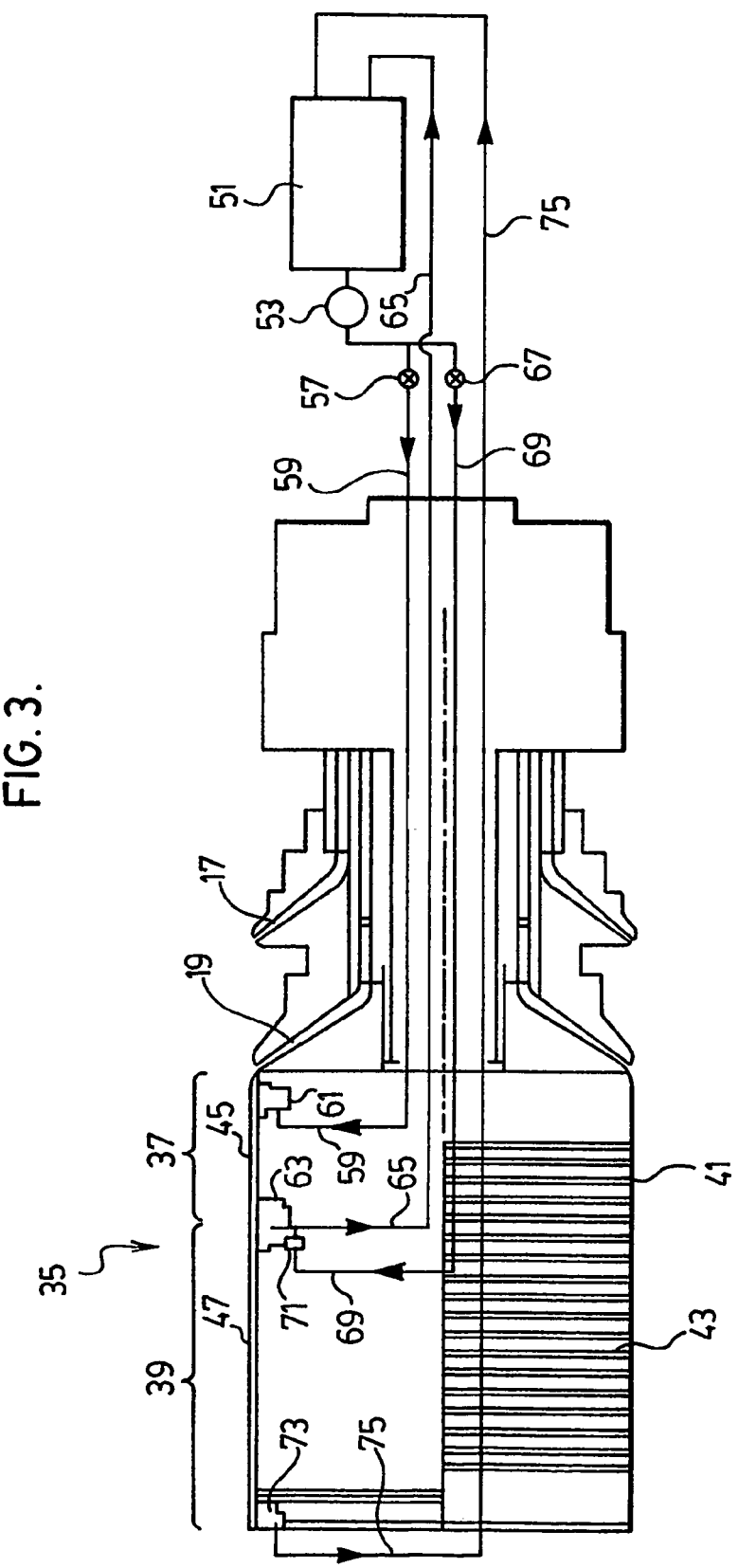
FIG. 3 is a schematic view showing the die tooling and cooling plug assembly from the apparatus of FIG. 1.

DETAILED DESCRIPTION ACCORDING TO THE PREFERRED EMBODIMENTS OF THE PRESENT INVENTION IN WHICH

FIG. 1 shows a pipe molding apparatus generally indicated at 1. This apparatus includes an extruder 3 which feeds molten plastic through die tooling 5 to a moving mold tunnel generally indicated at 11 of apparatus 1. Mold tunnel 11 is formed by mold block sections 7 and 9 which travel around endless belts. These mold block sections close with one another as they travel through mold tunnel 11.

FIG. 2 of the drawings shows that mold block sections 7 and 9 have internal faces with varying contours. More particularly, some of the mold block sections include a contour generally indicated at 13 which is essentially a sine wave contour. Others of the mold block sections include a more open contoured face region 15. Note that the sine wave contour of the mold block faces is provided to either side of the more open contour region 15.

FIG. 2 also shows that die tooling 5 includes a pair of channels 17 and 19. These channels receive the molten plastic from extruder 3 and feed that molten plastic through die tooling 5 onto the interior faces of mold blocks 7 and 9.

Provided downstream of the channels 17 and 19 is a cooling plug generally indicated at 35.

FIGS. 4 through 7 show the pipe wall 21 which is formed using the die tooling of FIG. 3. This pipe wall has first and second wall portions. The first wall portion is formed by a smooth flat interior wall layer 25 secured to the troughs of a corrugated exterior wall layer 23. The wall portion formed by smooth interior wall layer 25 in corrugations 23 is shaped by the contoured region 13 of the faces of the mold block sections.

The second wall portion comprises a belled coupling 27. In this belled coupling the inner and outer pipe wall layers are secured continuously against one another. The belled coupling is shaped in the face region 15 of mold blocks 7 and 9.

As is known in the art, the molten plastic is fed through passage 17 directly into the corrugations 13 and also directly into the bell forming portion 15 of the mold block faces. Suction may be used to help draw the molten plastic into these areas of the mold block faces. This forms the outer layer of the pipe wall.

In order to form the inner layer of the pipe wall the molten plastic is fed through passage 19 onto the bases of the corrugations 13 and further onto the interior surface of the belled coupling formed in the outer pipe wall layer. This pipe forming technique is known in the industry.

The key to the present invention lies in the control of the cooling plug 35 which is best seen having reference to FIGS. 3 through 7 of the drawings.

In order to best describe how the pipe wall is formed relative to the cooling plug, the first wall portion as described above will be referred to as the main pipe body. The belled coupling portion will be referred by that name.

As best seen in FIG. 4 of the drawings, the main body portion of the pipe and more particularly the inner wall layer of the main body portion of the pipe travels over and is in direct contact with the exterior surface of the cooling plug. The cooling plug as will be described later in greater detail is preferably cooled by chilled water. The temperature of the chilled water is at a level such that the cooling plug will set, without damaging the plastic in the pipe wall. In order to determine the temperature of the chilling water the compensating or cooling offsetting effect of the plastic in the pipe wall must be taken into account. In other words, the first wall portion of the pipe because it is in direct contact with the cooling plug and because it is in an essentially molten condition when it reaches the cooling plug has a tendency to heat up the cooling plug. The chilled water is therefore set at a relatively low temperature in order to negate or offset the heating effect of the pipe wall on the cooling plug.

As is to be understood from the description above the first wall portion therefore provides a temperature control to prevent excessive unwanted cooling of the plug.

Figure 6:
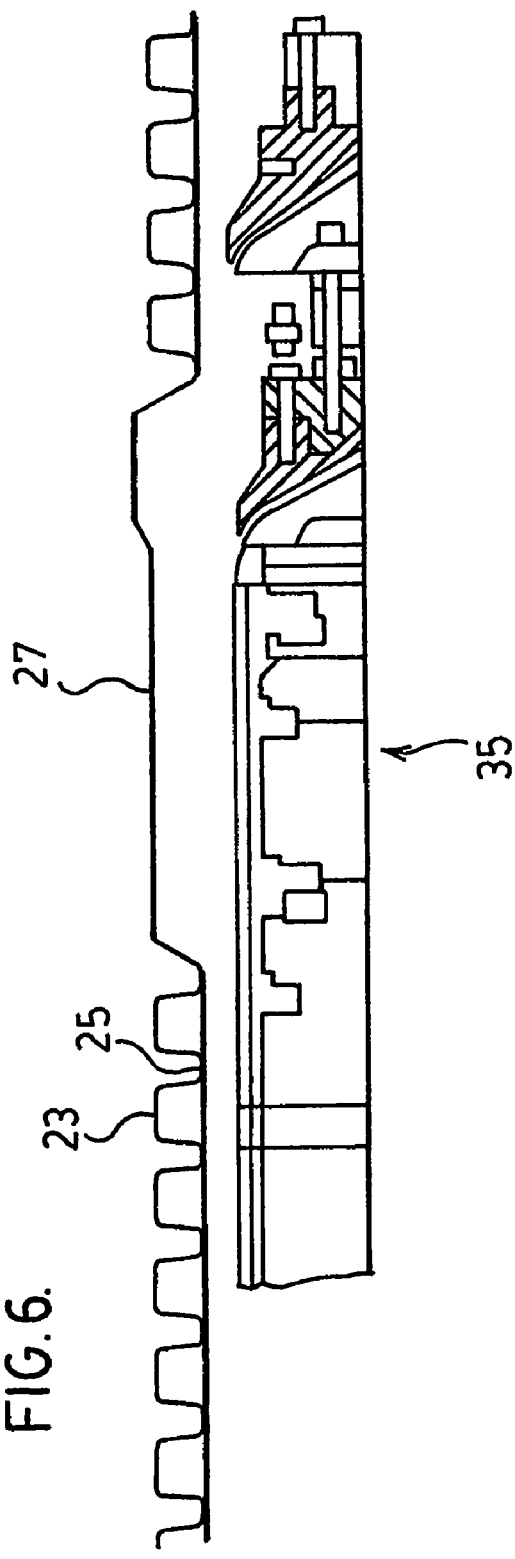

FIG. 6 is now to be compared with FIG. 4. It will be seen in FIG. 6 that .the first or upstream end of the cooling plug 35 is not in contact with the second wall portion formed by the belled coupling in the pipe wall. The downstream end of the cooling plug is still however directly in contact with the pipe wall.

In the FIG. 6 position the upstream end of the cooling plug in a conventional pipe forming apparatus drops to an unacceptably low temperature because it continues to be chilled to the same level without any offsetting heat being applied directly to the surface of the cooling plug. This is because the coupling bell is spaced outwardly away from the upstream end of the cooling plug. There may be some radiant heat from the pipe wall onto the cooling plug but this radiant heat from the pipe wall is not sufficient to hold the upstream end of the cooling plug at a desired operating temperature.

Due to the excessive cooling normally encountered prior to the present invention the upstream end of the cooling plug as described immediately above, the pipe wall and more particularly the main body of the pipe wall immediately following the coupling portion is adversely over cooled by the part of the cooling plug which is not in direct contact with the plastic. This over cooling of the plastic material in the main body portion results in hardening and even cracking of at least the first or second corrugation in the main body portion of the pipe following the belled coupling. This ends up being waste material that needs to be cut out of the pipe.

In accordance with the present invention a second temperature control means is provided to prevent excessive cooling of the cooling plug when the pipe wall is not in direct contact with the cooling plug i.e., when the belled wall portion is traveling over the cooling plug.

The second control means can take a number of different forms. For example, it can be a water flow adjuster which adjusts flow of chilling water to the cooling plug. With lower flow rates the cooling plug will not cool off as quickly or to such a low temperature.

The second temperature control could additionally be a water temperature adjuster which causes warmer water than the normally chilled water to enter the coils in the cooling plug when the cooling plug is not in direct contact with the pipe wall.

As a further alternative, the second temperature control may be an external heater such as a band heater located outwardly around the cooling plug. This band heater will provide heat to the cooling plug. The external heater will only be operative when there is no direct contact between the molten plastic and the pipe wall and the external surface of the cooling plug.

FIGS. 4 through 7 show different sequences of operation of a temperature controlled cooling plug according to the present invention. In FIG. 4 the entirety of the outer surface of cooling plug 35 is in contact with the first wall portion of the pipe wall. The belled coupling wall portion 27 is located upstream in the direction of pipe production relative to, the cooling plug.

The cooling plug of FIG. 4 receives chilling water at normal chilling temperatures over the entire length of the cooling plug.

In FIG. 5 the entirety of the exterior surface of the cooling plug is still in direct contact with the plastic of the first wall portion of the pipe. However, bell portion 27 is approaching a position in which it will soon move over the cooling plug. This is the position in which the second temperature control will initiate its operation at the upstream end of the cooling plug. The tempering effect on the cooling on the upstream end of the cooling plug will not necessarily have the immediate desired result but will start to take effect when the belled coupling 27 reaches the FIG. 6 position. In this position the belled coupling is approaching the downstream end of the cooling plug which will now be subjected to the control of the second temperature control.

Figure 7:
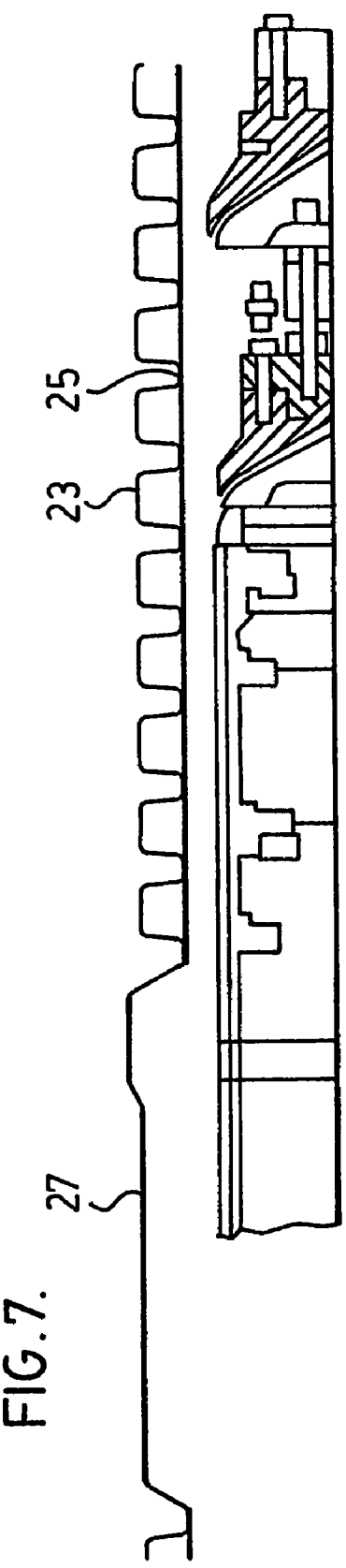

As a result of the above once the pipe wall reaches the FIG. 7 position the upstream end of the cooling plug will not have dropped to an overly chilled temperature. Therefore, the first wall portion of the pipe wall directly adjacent to and upstream of belled coupling portion 27 is not excessively cooled by the upstream end of the plug.

Also in the FIG. 7 position the second temperature control is shut off at the upstream end of the plug which is once again subjected to the first temperature control i.e., heat applied directly to the upstream end of the cooling plug by the plastic of the pipe wall.

In the FIG. 7 position the downstream end of the cooling plug will still be under the influence of the second temperature control until the main pipe body following belled coupling 27 completely covers the entire length of the cooling plug. Once the pipe wall has reached this position the entire plug falls completely under the control of the first temperature control provided by the heat transferring from the pipe wall to the plug.

It is to be noted that at all time cooling water will continue to circulate through the coils of the cooling plug as described later in more detail. However, the temperature of the water introduced to the cooling plug may vary in the different pipe wall positions shown in FIGS. 4 through 7 of the drawings.

FIG. 3 of the drawing shows a preferred embodiment construction of cooling plug 35. In this construction, the cooling plug has a first upstream section 37 and a second downstream section 39. Fluid carrying coils 41 wrap around plug section 37 while fluid carrying coils 43 wrap around section 39. Coils 41 and 43 do not feed into one another.

Provided at the upstream end of die tooling 5 is a water chiller 51. A pump 53 draws water from chiller 51 and forces the water through the die tooling to cooling plug 35.

Pump 53 feeds to a first flow line 59 and a second flow line 69. A water flow control valve 57 is provided at the upstream end of line 59 and a water flow control valve 67 is provided at the upstream end of line 69.

As will be seen in FIG. 3, flow line 57 feeds to a water inlet 61 of plug portion 37. This inlet feeds the coils 41 wrapping around plug portion 37.

Once the water from line 59 has completed its passage around the helically wound coils 41 it leaves these coils by means of water outlet 63. Water outlet 63 feeds through return line 65 back to chiller 51.

The water fed along line 69 past control valve 67 feeds to a water inlet 71. This inlet feeds the continuously wound helical coils 43 of the second section 39 of cooling plug 35. The water after having passed through coils 43 exits the second cooling plug section by a water outlet 73 leading to return line 75. Return line 75 carries the water back to chiller 51.

As will be appreciated from the description above there is a continuous flow of water between the chiller and both the first and second sections of the cooling plug. The water fed to the cooling plug sections from the chiller will initially be very cold. However, that water will gradually warm up as its travels through the helical coils in the two cooling plug sections. This is because of the heat to which the chilling water is subjected by the molten plastic of the pipe wall. In a case where the second temperature control comprises a heater externally of the cooling plug, this heater will also have a tendency to warm the water in the cooling plug sections. This water must then be returned to the chiller where the temperature of the water is lowered before it is returned back to the cooling plug sections.

Using the FIG. 3 setup and with the pipe wall in the FIG. 5 position for example, valve 57 feeding along 59 to the first cooling plug section 37 would be adjusted to decrease the flow of cooling water to plug section 37. This would be done just in advance of the bell 27 moving onto cooling plug section 37. The water flow to cooling plug section 39 would continue in the normal operating manner with the pipe wall in the FIG. 5 position.

When the pipe wall reaches the FIG. 6 position and again using the setup of FIG. 3 valve 57 would remain in its adjusted position to reduce the flow of cooling water to the first cooling plug section 37. At the same time valve 67 would be adjusted to also reduce the flow of cooling water to cooling plug section 39. This would occur just before the coupling bell 27 moves onto cooling plug section 39.

When the pipe wall reaches the FIG. 7 position, valve 57 would be adjusted to its full flow position to resume normal flow of the chilling water to plug section 37. Valve 67 would remain in its flow diminishing position while coupling portion 27 remains over plug section 39.

When the pipe moves back to the FIG. 4 position both valves 57 and 67 would be adjusted to their fully open positions to provide sufficient cooling to compensate for the direct contact of the pipe wall with the full exterior surfaces of both cooling plug sections.

Another feature of the present invention is found in the provision of vacuum slits 45 in cooling plug section 37 and vacuum slits 47 in cooling plug section 39. These vacuum slits are connected to two separate sources of vacuum. The vacuum is used to hold the first wall portion of the pipe wall onto the external surface of the cooling plug. However, when the coupling bell is moved into a position where it is over one of the cooling plug sections the vacuum for that section is turned off. This occurs in conjunction with the operation of the second temperature control to prevent excessive cooling of that section of the cooling plug.

Again, by way of example both full vacuum and full chilling water flow will be provided to both plug sections when the pipe wall is in the FIG. 4 position. When the pipe wall is in the FIG. 6 position the vacuum is turned off at the first plug section and the first plug section is subject to the control of the second temperature control. Vacuum will still continue to be applied at the second upstream plug section in the FIG. 6 position of the pipe wall. Also in this pipe wall position the upstream second plug section 39 continues to be under the temperature control provided by the heat from the pipe wall.

When the pipe wall reaches the FIG. 7 position the vacuum is turned off at the upstream plug section 39 and the second temperature control takes over to replace the first temperature control to prevent excessive cooling of the upstream plug section.

In the FIG. 7 position the vacuum is turned back on at the upstream plug section 37 and the second temperature control is turned off. The first temperature control provided by the heat coming directly from the pipe wall onto the first plug section 37 is used to prevent this plug section from dropping to an excessively low temperature.

The cooling system 100 shown in FIG. 8 is used for controlled cooling of the two stage cooling plug 104. This cooling plug includes a first stage 106 and a second stage 108. Cooling supply line 102 provides cooling fluid to the first stage supply line 110 after passing through the first stage control valve 124 and a return line 112. Second stage supply line 114 is connected to the supply line 102 upstream of the temperature control valve 124. The second stage cooling plug 108 has a second stage control valve 126 in this case shown associated with the return line 116.

The first stage cooling plug 106 includes a temperature sensor 120 which provides feedback regarding the temperature of the first stage cooling plug to the first stage control valve 124. The second stage temperature sensor 122 provides feedback for controlling the second stage control valve 126.

The controller 118 receives the temperature sensor singles and appropriately controls the valves 124 and 126.

With the arrangement as shown in FIG. 8 accurate temperature control of the stage cooling plug 106 and the second stage cooling plug 108 is achieved. With both of these systems the temperature can be maintained within an acceptable range for the particular product being extruded. With the above arrangement, accurate control of the first stage is achieved to effect a desired amount of cooling of the product without damage to the product. Excessive cooling can cause the product to be brittle whereas a controlled cooling of the part allows the product to be cooled and is referred to as tempered plastic. With the arrangement as shown in FIG. 8 the extruder is capable of forming product much faster without wastage of the initial product. This is possible due to the controlled cooling and precision possible with the temperature feedback arrangement and the control of the two control valves 124 and 126.

An alternate system is shown in FIG. 9. Once again the cooling plug has a first stage cooling plug 131 and a second stage cooling plug 133. A temperature sensor 140 is associated with the first stage cooling plug 131. The system 130 of FIG. 9 provides precision control over the first stage cooling and general cooling of the second stage cooling plug 133 as will be fully described.

The system 130 includes a reservoir 132 which is part of a chiller. The reservoir 132 is used to maintain the cooling media at a desired temperature. Pump 134 causes the cooling medium to flow through line 136 to the first stage cooling plug 131 whereby the first stage cooling plug is essentially at and maintained at the temperature of the reservoir. The cooling medium is returned to the reservoir 132 through the return line 138. The reservoir 132 includes its own sensor 142 which is used by the controller 144 to vary the amount of cooling water provided through supply line 148 to the heat exchanging coil 150. The amount of flow through the coil 150 is adjusted by the control valve 160. Thus the control valve 160 is adjusted by the temperature sensor 142 and/or the temperature sensor 140 whereby the temperature of the reservoir is maintained at a desired set temperature. Thus the operator can set the temperature of the reservoir which effectively determines the temperature of the first stage cooling plug 131. With this arrangement the cooling plug is maintained at the desired temperature and the amount of fluid pumped through the cooling plug assures the cooling provided to the extruded product does not substantially change the temperature of the cooling plug. Any variation due to the shape of the product being produced does not produce a damaging variation of the temperature of the cooling plug. With this arrangement the operator can set and maintain the desired temperature of the cooling plug 131 within a relatively narrow range. With this arrangement tempering of the product as it is being used is achieved as the product passes over the first stage and once the product has been effectively tempered it is then possible to continue to remove heat from a product by the second stage cooling plug 133. Control of the actual temperature of second stage is not as critical and in this case cooling for the second stage is provided by tapping into the supply line 148 to provide a cooling source for the supply line 154 of the second stage cooling plug 133. The return line for the second stage cooling plug is shown as 156 and taps into the discharge line 152.

With the arrangement as shown in FIG. 9 the precision control on the first stage cooling plug allows general cooling in the second stage while still allowing excellent control of the product. This arrangement is also suitable for allowing fast setup of the extruder without damage of the initial product being extruded. Furthermore, the control arrangement provides for good response to other environmental conditions such as variations in the extruder, variations in the production rates; ambient temperatures etc. This is also true of the system of FIG. 8 however in FIG. 8 additional control is achieved due to the tracking of the second stage cooling plug 108.

The system described in the present application shows the overall control system for an extruder. This ability to provide different monitored cooling of a first stage and second stage cooling plug is also advantageous in retro-fit applications. As can be appreciated a single stage cooling plug of a length corresponding to the two stage cooling plug of FIG. 10 can be replaced by the two stage cooling plug 170. Such a two stage cooling plug can be used with either of the control systems of FIGS. 8 and 9.

In some extruders perhaps only a single stage cooling plug is necessary and the cooling plug 172 can be inserted. In this case, either the temperature control as described in FIG. 8 can be used for the first stage or the temperature control of FIG. 9. Variations in length of the cooling plug can be adjusted by using a fill-in plug at the downstream portion of the cooling plug 172 if necessary.

The cooling plugs as shown in FIGS. 8 and 9 are preferably dependent of one another to reduce the amount of heat transferred between the plugs. If desired the plugs can include additional structure at the junction to further reduce the heat transfer therebetween. Basically, the breaking of the plug into a first stage and a second stage does allow if desired the ability to provide a partial thermal break therebetween.

The earlier figures describe variations of the control valves associated with a first stage and a second stage. In accordance with the shape of the product being produced. Knowledge of the shape of the product can be used for adjusting of the control valves to achieve a desired degree of cooling. In FIGS. 8 and 9 sensing of the temperature associated with the cooling plugs and/or the temperature of the fluid in the discharge lines can be used as a feedback mechanism for varying the position of the control valves. In this system it is not necessary to know the product being extruded as the control valve is very quickly to achieve the desired degree of cooling. In the system of FIG. 9 a reservoir is controlled to provide cooling fluid at a desired temperature and the amount of fluid provided to the first stage plug is such that to a large extent it is not appreciably effected by changes in the shape of the product being extruded. Such a system is more forgiving with respect to initial product being produced as well as any changes which occur during the production process.

With the systems as described over cooling of the cooling plugs is avoided and as such the temperature of the cooling plugs do not appreciably vary which could cause excessive cooling of the product and damage to the product. This possibility of damaging of the product is more pronounced in association with the first stage cooling and typically the second stage cooling is less vulnerable to wide temperature variations which cause product damage. Depending upon the particular application and the type of product being produced control of the second stage as set out in the application is also desired.

Although various preferred embodiments of the present invention have been described in detail, it will be appreciated by those skilled in the art that variations may be made without departing from the spirit of the invention or the scope of the appended claims.

The invention claimed is:

1. A pipe molding system for producing plastic pipe, said system including a plurality of moving first mold block sections and second moving mold block sections, the first mold block sections closing with the second mold block sections to form a moving mold tunnel, means for feeding molten plastic to the first and second mold blocks sections to form the plastic pipe, and a cooling plug for setting the plastic pipe in the moving mold tunnel, the plastic pipe having a pipe wall with a first wall portion which travels over and is in contact with said cooling plug and a second wall portion which travels over and is spaced outwardly away from said cooling plug, the first wall portion transferring heat directly to said cooling plug;

said system including a first temperature control to prevent excessive plug cooling as the first wall portion travels over the cooling plug, said system including a second temperature control which operates to replace the first temperature control in preventing the excessive plug cooling as the second wall portion of the pipe wall travels over the cooling plug.

2. The pipe molding system of claim 1 wherein said cooling plug is cooled by a supply of chilled water, said second temperature control comprising a water flow adjuster to reduce flow of the chilled water to the cooling plug when the second wall portion of the pipe wall travels over the cooling plug.

3. The pipe molding system of claim 1 wherein said cooling plug is cooled by a supply of chilled water, the chilled water being at a first temperature as the first wall portion travels over the cooling plug, said second temperature control comprising a water temperature control which raises temperature of the chilled water above the first temperature as the second wall portion of the pipe wall travels over the cooling plug.

4. The pipe molding system oft claim 1 wherein said cooling plug is internally cooled by a supply of chilled water, said second temperature control comprising a heater externally of and directing heat onto said cooling plug when said second wall portion of said pipe travels over said cooling plug, said heater being inactive when said first wail portion of the internal wall of the pipe travels over the cooling plug.

5. The pipe molding apparatus of claim 1 wherein said system includes means to produce vacuum at the cooling plug when the first wall portion travels over the cooling plug to assist in maintaining the first wall portion in contact with the cooling plug, the means to produce vacuum being turned off when said second temperature control is operated as the second wall portion of the internal wall of the pipe travels over the cooling plug.

6. The pipe molding system of claim 1 wherein said system includes means to produce a vacuum at the cooling plug and said cooling plug comprises first and second plug sections;

said first plug section being subjected to the vacuum and being temperature controlled only by the first temperature control of the heat of the first wall portion to prevent the excessive plug cooling as the first wall portion travels over the first plug section while, at the same time, the second plug section is free of the vacuum and is subjected only to the second temperature control to prevent the excessive plug cooling as the second wall portion of the internal wall of the pipe travels over the second plug section, and then as the pipe moves along the mold tunnel, said first plug section being free of vacuum and being temperature controlled only by the second temperature control to prevent the excessive plug cooling as the second wall portion of the internal wall of the pipe travels over the first plug section while, at the same time, the second plug section is subjected to the vacuum and is temperature controlled only by the first temperature control of the heat of the first wall portion as the first wall portion of the internal wall of the pipe travels over the second plug section.

* * * * *